(12) United States Patent
Gerome

(10) Patent No.: US 7,621,589 B1
(45) Date of Patent: Nov. 24, 2009

(54) PANELS FOR A WALLED ENCLOSURE

(76) Inventor: Perry Gerome, 1903 U.S. 50, Batavia, OH (US) 45103

( * ) Notice: Subject to any disclaimer, the term of this patent is extended or adjusted under 35 U.S.C. 154(b) by 602 days.

(21) Appl. No.: 11/437,759

(22) Filed: May 22, 2006

(51) Int. Cl.
B60J 5/00 (2006.01)
(52) U.S. Cl. .................................. 296/186.1; 52/309.9
(58) Field of Classification Search ............. 296/186.1, 296/191, 181.6; 52/239, 582.1, 584.1, 586.1
See application file for complete search history.

(56) References Cited

U.S. PATENT DOCUMENTS

| | | | | |
|---|---|---|---|---|
| 3,367,076 A | * | 2/1968 | O'Brien | 52/394 |
| 3,386,218 A | * | 6/1968 | Scott | 52/309.11 |
| 3,397,496 A | * | 8/1968 | Sohns | 52/286 |
| 3,535,844 A | * | 10/1970 | Glaros | 52/592.1 |
| 3,667,180 A | * | 6/1972 | Tischuk | 52/309.2 |
| 3,714,747 A | * | 2/1973 | Curran | 52/309.2 |
| 3,760,548 A | * | 9/1973 | Sauer et al. | 52/592.1 |
| 3,797,190 A | * | 3/1974 | Widdowson | 52/592.4 |
| 4,104,840 A | * | 8/1978 | Heintz et al. | 52/309.9 |
| 4,184,301 A | * | 1/1980 | Anderson et al. | 52/478 |
| 4,316,351 A | * | 2/1982 | Ting | 52/309.9 |
| 4,388,361 A | * | 6/1983 | Vassalli | 428/192 |
| 4,575,981 A | * | 3/1986 | Porter | 52/309.9 |
| 4,769,963 A | * | 9/1988 | Meyerson | 52/309.9 |
| 4,936,078 A | * | 6/1990 | Porter | 52/592.1 |
| 4,958,472 A | | 9/1990 | Ehrlich | |
| 4,998,396 A | * | 3/1991 | Palmersten | 52/588.1 |
| 5,138,812 A | * | 8/1992 | Palmersten | 52/588.1 |
| 5,247,770 A | * | 9/1993 | Ting | 52/309.9 |
| 5,285,609 A | * | 2/1994 | Goad | 52/588.1 |
| 5,293,728 A | * | 3/1994 | Christopher et al. | 52/588.1 |
| 5,363,606 A | * | 11/1994 | Esposito | 52/11 |
| 5,403,062 A | * | 4/1995 | Sjostedt et al. | 296/186.1 |
| 5,448,865 A | * | 9/1995 | Palmersten | 52/309.9 |
| 5,533,312 A | * | 7/1996 | Mihalcheon | 52/309.9 |
| 5,673,524 A | * | 10/1997 | Gailey | 52/309.9 |
| 5,678,369 A | * | 10/1997 | Ishikawa et al. | 52/309.9 |
| 5,730,485 A | * | 3/1998 | Sjostedt et al. | 296/181.3 |
| 5,791,726 A | * | 8/1998 | Kaufman | 296/182.1 |
| 5,799,462 A | * | 9/1998 | McKinney | 52/742.13 |
| 5,927,032 A | * | 7/1999 | Record | 52/309.11 |
| 5,938,274 A | * | 8/1999 | Ehrlich | 296/191 |
| 5,992,117 A | * | 11/1999 | Schmidt | 296/186.1 |
| 5,997,076 A | * | 12/1999 | Ehrlich | 296/186.1 |
| 6,199,939 B1 | | 3/2001 | Ehrlich | |

(Continued)

Primary Examiner—Kiran B. Patel
(74) Attorney, Agent, or Firm—Charles R. Wilson

(57) ABSTRACT

Panels of the invention are used to form large capacity enclosure sidewalls. Trailers, trucks and cargo vans are examples of such enclosures. Intermediate framing support is not needed. Each panel has a polymeric core with a first metal cladding and a second metal cladding. The core has opposed longitudinal configured ends, each of which has a stepped shoulder which extends the length of the panel. The metal claddings follow the contour of the stepped shoulder. The stepped shoulders are offset from the first face of the core approximately one-half the thickness of the panel. In assembling a walled enclosure sidewall, the panels are positioned so that adjacent stepped shoulders mate together to create a flush face surface. Joining means are used in the stepped shoulder areas to permanently join together adjacent panels. The joint formed by the attachment has a total of four metal cladding layers and two interposed polymeric cores to give the joint sufficient rigidity for the sidewall to withstand normal forces during use.

20 Claims, 4 Drawing Sheets

U.S. PATENT DOCUMENTS

| | | | | |
|---|---|---|---|---|
| 6,220,651 B1 * | 4/2001 | Ehrlich | ................ | 296/191 |
| 6,311,456 B1 * | 11/2001 | Rodero Antunez | ........ | 52/794.1 |
| 6,349,988 B1 * | 2/2002 | Foster et al. | ............ | 296/181.6 |
| 6,412,854 B2 | 7/2002 | Ehrlich | | |
| 6,418,686 B1 * | 7/2002 | Record | ............ | 52/309.15 |
| 6,497,079 B1 * | 12/2002 | Pletzer et al. | ............ | 52/592.4 |
| 6,526,719 B2 * | 3/2003 | Pletzer et al. | ............ | 52/592.2 |
| 6,578,902 B2 * | 6/2003 | Sill | ................ | 296/186.1 |
| 6,626,622 B2 * | 9/2003 | Zubko | ................ | 296/186.1 |
| 6,647,689 B2 * | 11/2003 | Pletzer et al. | ............ | 52/592.1 |
| 6,808,777 B2 * | 10/2004 | Andersson et al. | ............ | 428/47 |
| 6,857,243 B2 * | 2/2005 | Bloomfield | ............ | 52/591.4 |
| D523,780 S * | 6/2006 | Conny et al. | ............ | D12/106 |
| 7,107,731 B2 * | 9/2006 | Record | ................ | 52/309.9 |
| 2007/0029839 A1 * | 2/2007 | Lemmons | ............ | 296/186.1 |

* cited by examiner

PANELS FOR A WALLED ENCLOSURE

FIELD OF THE INVENTION

This invention relates to a panel for use on walled enclosures. More particularly, the invention relates to a panel used for building a sidewall of a large capacity walled enclosure without 5 the need for intermediate framing support.

BACKGROUND OF THE INVENTION

Large capacity walled enclosures of all natures are found in commerce. A particularly prevalent walled enclosure which is found on the nation's roadways is the trailer component of a tractor-trailer. The trailers are rather basic in their design. They have a bed frame on which are mounted a minimum of two wheels and an axle. Eight or more wheels on a trailer is not unusual. The bed frame further has corner posts and sidewall posts extending from the bed frame to a top rail. Multiple panels are secured to the posts to enclose an area used for transporting all types of cargo.

Panels used in forming the trailer sidewalls are typically about four feet in width and anywhere from five feet to ten feet in height. The panels must be rigid and have sufficient strength to withstand the normal forces of weather as well as accidental bumpings encountered in cargo loading and unloading operations. They are preferably light-weight so that as much cargo can be transported given tractor-trailer size and weight limitations imposed by state and federal departments of commerce. Sheet metals with framing posts have been used. More commonly, the panels have a sandwich configuration of a solid or foamed polymeric core with metal claddings. The metal typically is steel or aluminum. The panels are simply attached to posts on the trailer's frame, much as drywall is attached to studs in a house to create an enclosed walled area. Seams created by joining together two panels must be weather-tight.

Trucks and vans are also built with an integral walled enclosure for cargo. The walled enclosure is similar to that of a trailer, requiring at least two panels to form a sidewall.

Other examples of walled enclosures include walk-in storage boxes for furniture and the like, emergency shelters, mobile homes, cargo trailers, medical testing facilities, satellite television link-up vans, and livestock trailers. While the walled enclosures are made in various configurations, all have a floor, ceiling, and sidewalls. A common feature of the enclosures is a sidewall panel. In most instances, one or more panels are attached to framing to create the enclosure.

A disadvantage of known panels for large capacity walled enclosures is that many require intermediate support posts. The posts are needed to support and securely hold the panels in place. The posts are typically formed steel or extruded aluminum. They necessarily add to the enclosure's cost and weight. Further, they must be precisely machined to receive panel attaching means.

There has now been developed a panel with an edge designed for building sidewalls of a walled enclosure without the need for intermediate sidewall posts. The panels are economically produced and efficiently installed. The resultant sidewall of the enclosure consisting of the panels has the requisite rigidity and strength demanded of industry acceptable large capacity walled enclosures.

SUMMARY OF THE INVENTION

Panels of the invention have a polymeric core with a first metal cladding covering a first face of the core and a second metal cladding covering a second face of the core. The panels have opposed configured ends, each of which has a stepped shoulder along its length. Each stepped shoulder is offset approximately one-half the thickness of the panel. In building an enclosure sidewall, the panels are positioned so that the offset shoulders of two adjacent panels mate to create a smooth flush surface at the joint. The panels are attached together in the shoulder areas by the use of adhesive or mechanical joining means. The resulting joint has four layers of metal cladding along with two interposed polymeric cores. The joints formed by abutting panels provide the needed rigidity to the sidewall, thereby eliminating the need for intermediate sidewall posts.

DETAILED DESCRIPTION OF THE INVENTION

The panels of the invention are described in detail in the paragraphs which follow and with reference to the drawings. The panels are of particular use in trailers which are then coupled to tractors. For this reason, the description and drawings are with reference to trailers. The panels can as well be used to build sidewalls of other large capacity walled enclosures such as previously described. For purposes of this invention, a large capacity walled enclosure has a capacity of at least about 200 cubic feet.

Figure 1:
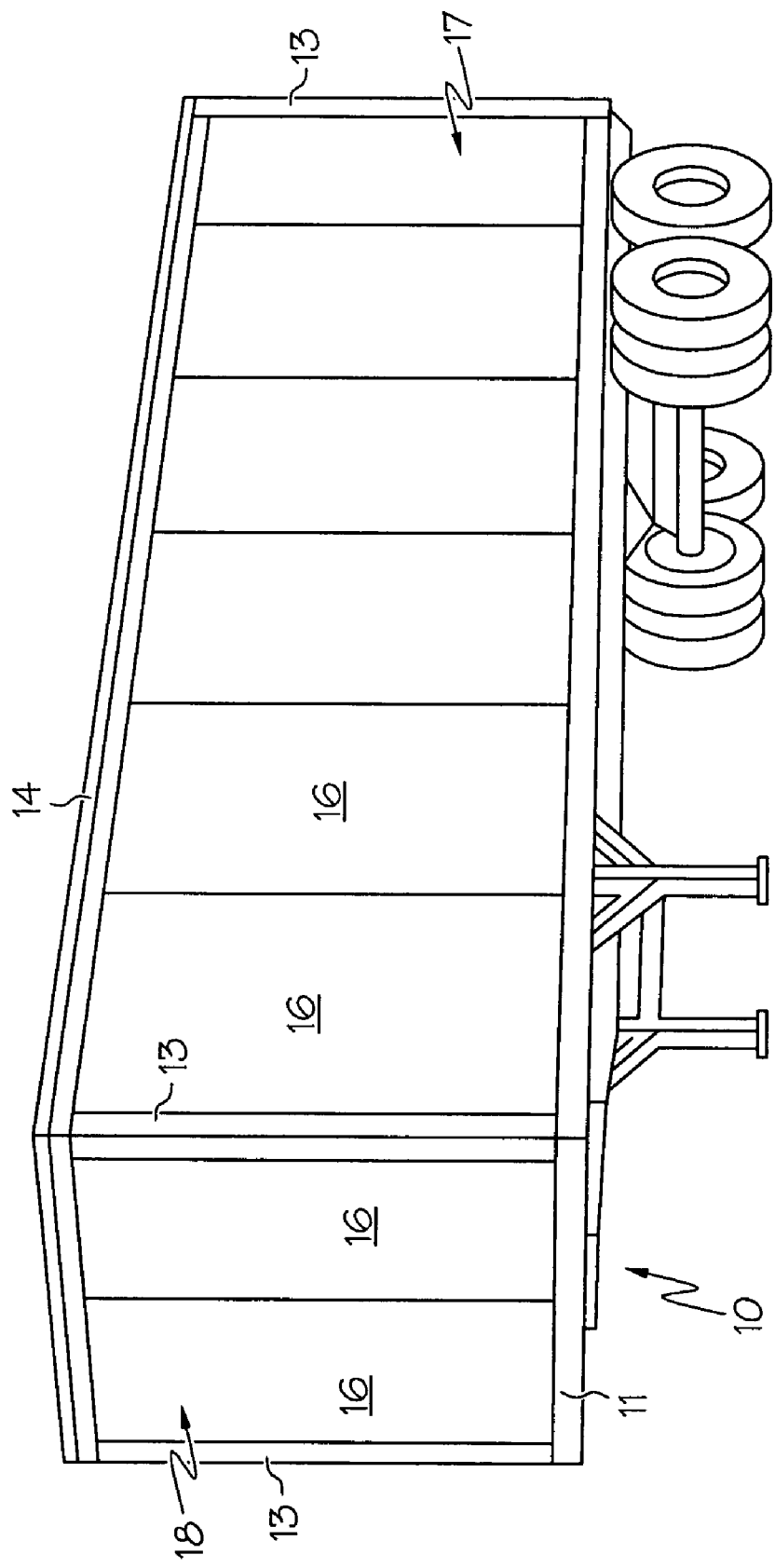
FIG. 1 is an environmental view of a trailer with panels of the invention joined together to form sidewalls.

With reference to FIG. 1, a trailer 10 has a bed frame 11 which supports the floor of the trailer. The bed frame is rectangular-shaped and consists of metal rails secured together. Corner posts 13 extend vertically from the bed frame at each of its four corners. A top rail 14 extends horizontally from the top of each of the corner posts to form a support surface for a roof. Panels 16 of the invention are positioned along the bed frame's perimeter and are joined together to create two sidewalls 17 (one of which is depicted) and an end wall 18. For purposes of this invention, the term sidewall is considered to include the wall at the end of the trailer.

Figure 2:
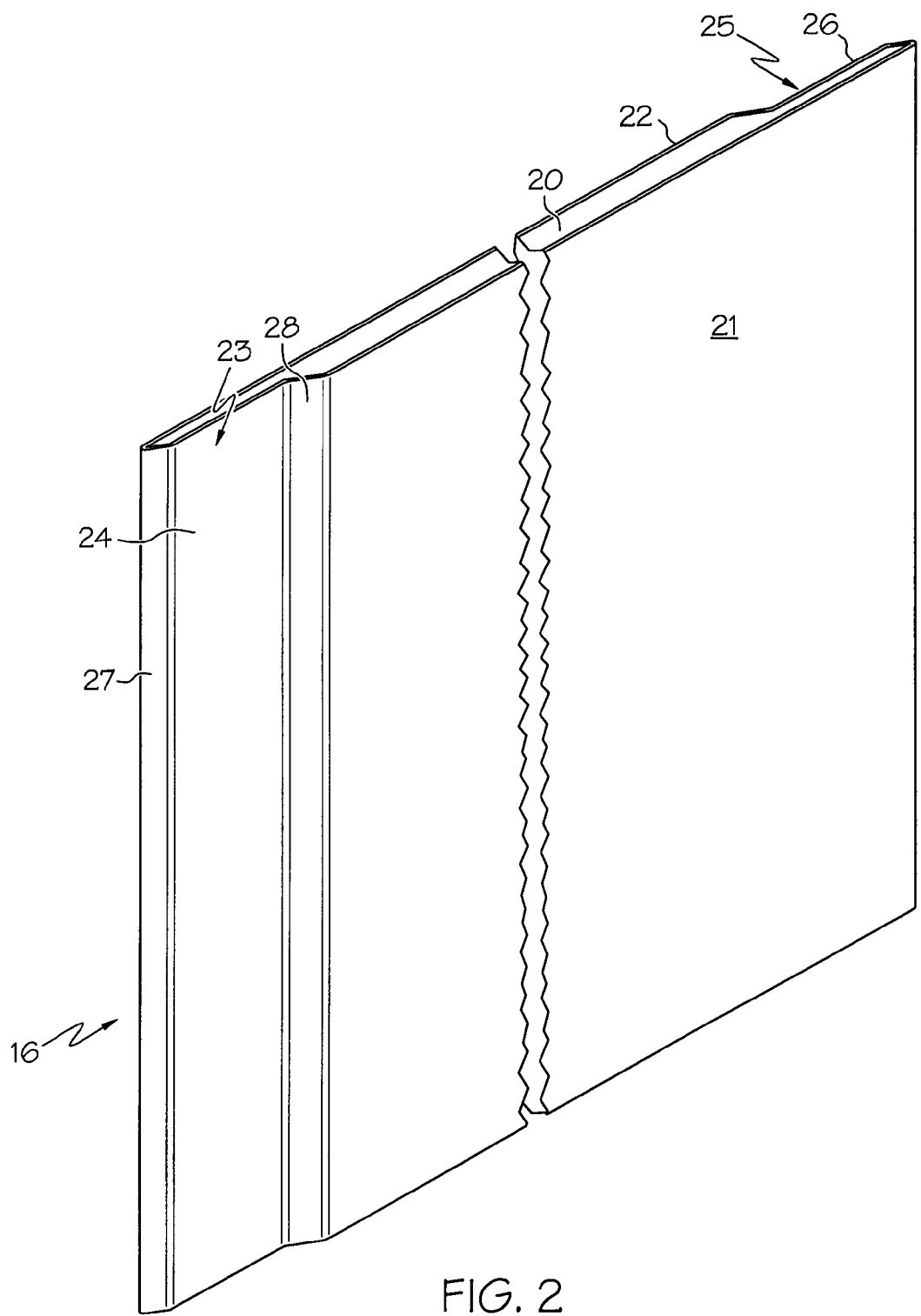
FIG. 2 is a view in perspective of a panel used to form the sidewalls of the trailer of FIG. 1.
Figure 3:
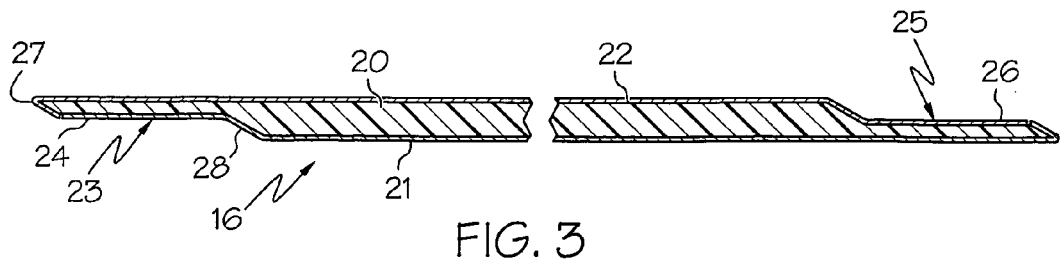
FIG. 3 is a top view of the panel of FIG. 2.

The panel 16 of the invention is best seen in FIGS. 2 and 3. It is a thin rectangular-shaped member with a substantially flat front side and substantially flat back side. It ranges from about three feet to about six feet in width and about four feet to about twelve feet in length. Preferably, the panel has a width of from about four feet to about five feet and a length of about six feet to about ten feet. It should be understood, other dimensioned panels can be made, depending only on constrictions required for the trailer and its use. The thickness of the panel ranges up to about one-half inch, preferably from about 150 mils to about 500 mils.

The panel 16 is comprised of a polymeric core 20, a first metal cladding 21 adhered to a first face of the core 20 and a second metal cladding 22 adhered to a second face of the core 20. The claddings 21 and 22 substantially fully cover the two faces of the core 20. The panel 16 further has a first longitudinal configured end 23 extending fully down the panel. The configured end includes a first stepped shoulder 24. An opposed second longitudinally configured end 25 extends fully down an opposite side of the panel. It includes a second stepped shoulder 26. The components of the panel are further described in the next paragraphs as is the mode of joining two or more panels to create a sidewall.

Polymeric cores are used in panels intended for use in building trailer sidewalls. They serve as a light-weight substrate for the more durable, though heavier, metal claddings. Any of various polymeric materials can be used as the core of the panels of the invention. Polyethylene and polypropylene are typically used. They can be solid or foamed. The foamed cores are desired when a light-weight construction is paramount. Sheets of the solid or foamed polymeric materials are commercially available or can be custom manufactured to a precise width, length and thickness.

The metal claddings have a thickness which is not critical, though generally are less than about 40 mils to minimize weight and costs. Preferably, the metal claddings range from about 10 mils to about 25 mils. Metal claddings are well known in the panel industry. Steel and aluminum are common.

In accord with this invention and as best seen in FIGS. 2 and 3, the panel 16 has the first stepped shoulder 24 on the first face and extending along the longitudinal configured end 23 of the panel and the second stepped shoulder 26 on the second face and extending along the opposed longitudinal configured end 25. The stepped shoulders are substantially identical in shape and size to ensure an adjacent panel of like kind will properly mate as evident in FIG. 4.

Each stepped shoulder has a depth as measured from a top surface of a panel face to a top surface of the shoulder of approximately one-half the thickness of the panel. An indentation created by the stepped shoulder 24 extends from a terminus of the panel inwardly, preferably about one inch to about four inches, and terminates. Generally, the greater the overlap of stepped shoulders when mated together the greater the strength of the joint.

In this embodiment of the invention, the panel's external edge 27 is beveled as is an internal edge 28 of the stepped shoulder. Further, the walls are beveled at the same angle so as to be parallel to one another. The opposed configured end of the panel is substantially identical in size and shape. The beveling is preferred. It is forgiving in that it allows for a smoother surface transition when adjacent panels are permanently joined together in building a sidewall. This is beneficial in alleviating cargo snagging on the internal sidewalls of the cargo area.

Figure 4:
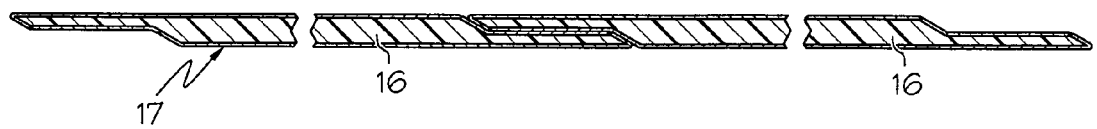
FIG. 4 is a top view of two FIG. 2 panels of the invention adjacent one another and joined together with adhesive.

Now with reference to FIG. 4, a section of the sidewall 17 is depicted showing two adjacent panels 16 permanently joined together. The panels are oriented so that collectively the panels form flush smooth outer faces and smooth inner faces. That is, the panels are joined in their stepped shoulder areas. An adhesive is used in the FIG. 4 embodiment of the invention for panel joining purposes. Suitable commercially available adhesives are used.

Figure 5:
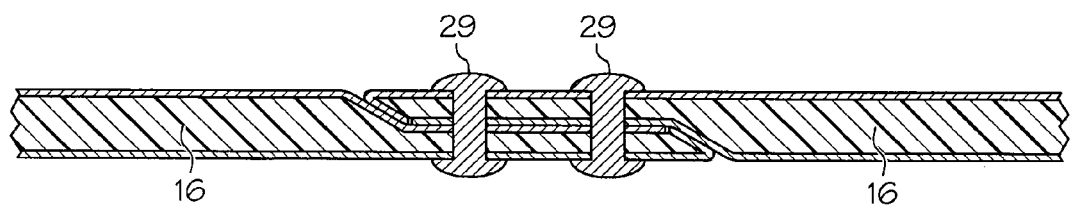
FIG. 5 is a top view of two FIG. 2 panels adjacent one another and joined together with rivets.

A mechanical joining means can also be used to join together the panels. As shown in FIG. 5, one or more rows of rivets 29 extend fully through the two stepped aligned shoulders of the panels 16. The rivets are spaced about every one inch to about three inches along the length of the panels. Preferably, a gasket or elastic sealing bead is also provided between the two stepped shoulders to ensure a weather-tight seal.

As evident in FIGS. 4 and 5, when two panels of the invention are properly joined, a resultant joint has four layers of metal claddings and two interposed polymeric cores. Combined, they add sufficient rigidity to the joint to eliminate a need for conventional intermediate sidewall posts used in building trailer sidewalls.

Figure 6:
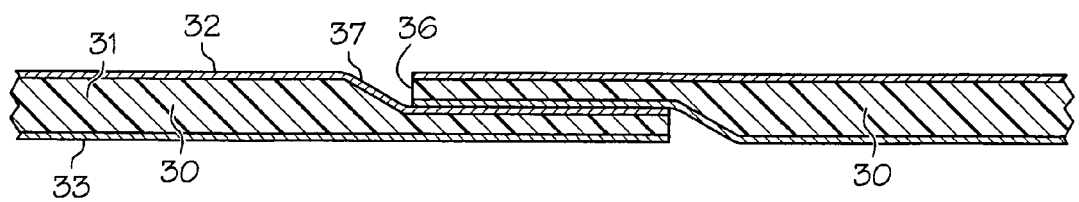
FIG. 6 is a top view of two panels of the invention with blunt terminus configured ends joined together with adhesive.

FIG. 6 shows another embodiment of the invention where external edges of the panels are blunt. Each panel 30 has a solid polymeric core 31 and metal claddings 32 and 33 on opposed core faces. A wall gap is created when the external edge 36 is blunt and the internal edge 37 of a stepped shoulder is beveled as shown. Caulking or some other filler material is preferably used to minimize snagging problems. Squaring off the internal edge 37 of the stepped shoulder alleviates the possibility for snagging to a certain extent.

Figure 7:
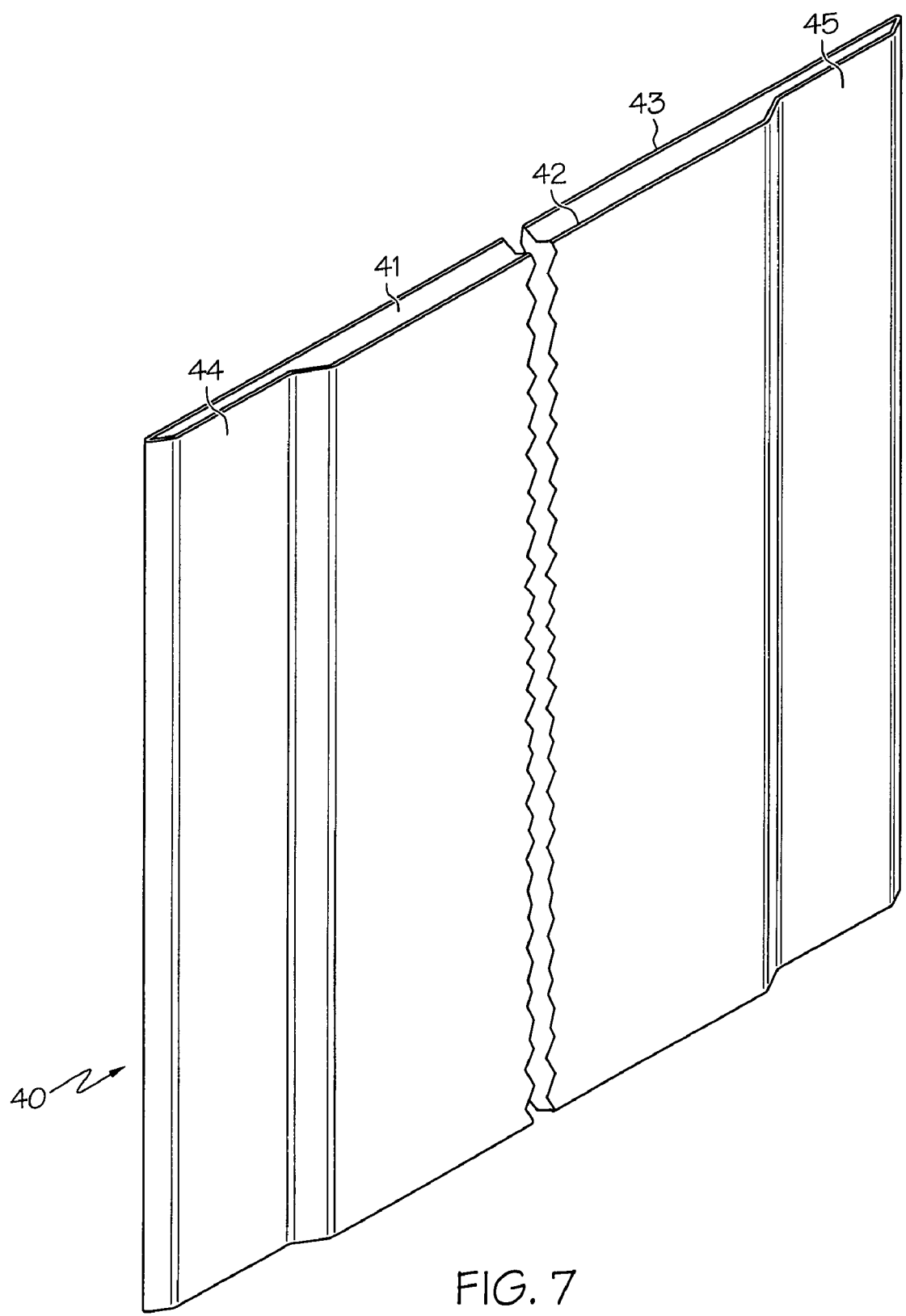
FIG. 7 is a view in perspective of an alternative panel of the invention having opposed configured ends with stepped shoulders that are on the same face of the panel.

FIG. 7 shows an alternative panel 40 of the invention. It has a foamed polymeric core 41, a first metal cladding 42 adhered to a first face of the core, and a second metal cladding 43 adhered to a second face of the core. The core and the metal claddings are similarly dimensioned and made of the same materials as that described with reference to the panels 16 described with reference to FIGS. 1-4. In accord with this aspect of the invention, a first stepped shoulder 44 on a first longitudinal end and a second stepped shoulder 45 on an opposed second longitudinal end are both found on the same face of the panel. Each is offset from the panel's face approximately one-half the thickness of the panel. There are some manufacturing efficiencies in producing the panels of the invention in this manner. A drawback is that during building of a sidewall, adjacent panels must be flipped to mate properly. Further, metal claddings on both sides of the polymeric core need to be essentially identical in thickness, color and material to obtain uniform appearing sidewall surfaces.

The drawings depict panels of the invention wherein the configured ends extend longitudinally along the panels on two opposed sides. It should be apparent, the invention includes panels wherein the configured ends extend laterally on two opposed sides. Further, it should be apparent the panels can be laid lengthwise and joined to create a sidewall where the joint between panels runs horizontally.

Panels of the invention are manufactured preferably in a continuous process. Thus, a processing line can feed two coils of metal sheeting to an extrusion head where a molten polymeric material is continuously extruded in a proper thickness between the two metal sheets. As the polymeric material cools, it adheres to the metal. A mechanical force is imparted to at least one edge to create a stepped shoulder. Ultimately, the formed product is cut to length. Alternatively, a single section of polymeric core is cut to size, a piece of metal cut to size is adhered to one side, and a second piece of metal cut to size is adhered to the other side. The stepped shoulders can be formed in the polymeric core and metal prior to assembly together or mechanically formed into the assembled panel. Whether the continuous process or singular process is used, manufacturing of panels of the invention is accomplished using processing techniques known in the industry.

Panels of the invention can further have features of an obvious nature. For example, all exposed metal edges can be rolled to minimize snagging. Protective coatings can be applied. Still other features commonly found on panels of the same general nature can be incorporated into the panels described above in detail.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A panel for building a large capacity walled enclosure, said panel having a front side and a back side and comprising a polymeric core having a first face with a metal cladding adhered thereto and a second face with a metal cladding adhered thereto, further said panel having a first configured end and a second opposed configured end substantially identical in shape and size to the first configured end, with each said configured end having a stepped shoulder extending along a length thereof, whereby each stepped shoulder of the panel is for mating to a stepped shoulder of a like panel and attaching thereto to create a joint of four metal claddings with two interposed polymeric cores and having sufficient rigidity for forming a sidewall of the large capacity enclosure.

2. The panel of claim 1 wherein the polymeric core is solid.

3. The panel of claim 1 wherein the polymeric core is foamed.

4. The panel of claim 1 wherein each stepped shoulder is offset from a face of the panel approximately one-half the thickness of the panel.

5. The panel of claim 4 wherein the first configured end is on the front side of the panel and the second configured end is on the back side of the panel.

6. The panel of claim 5 wherein each stepped shoulder has a beveled external edge.

7. The panel of claim 1 wherein the metal claddings on the first face and on the second face of the polymeric core are steel.

8. The panel of claim 1 wherein the metal claddings on the first face and on the second face of the polymeric core are aluminum.

9. The panel of claim 1 wherein the panel is rectangular-shaped.

10. The panel of claim 9 wherein said panel has a width of from about three feet to about six feet, a length of from about four feet to about twelve feet and a thickness of up to about one-half inch.

11. The panel of claim 10 wherein the thickness of the panel ranges from about 150 mils to about 500 mils.

12. The panel of claim 11 wherein the metal claddings on the first face and on the second face of the polymeric core are each about 10 mils to about 25 mils in thickness.

13. A sidewall of a large capacity walled enclosure of at least two panels each having a front side and a back side and permanently joined together, each said panel comprising a polymeric core having a first face with a metal cladding adhered thereto and a second face with a metal cladding adhered thereto, further each said panel having a first configured end and a second opposed configured end substantially identical in shape and size to the first configured end, with each said configured end having a stepped shoulder extending along a length thereof, whereby each stepped shoulder of a panel is mated to a stepped shoulder of a like adjacent panel and permanently joined thereto to create a rigid joint of four metal claddings with two interposed polymeric cores.

14. The sidewall of claim 13 wherein the polymeric core of each panel is solid.

15. The sidewall of claim 13 wherein the polymeric core of each panel is foamed.

16. The sidewall of claim 13 wherein each stepped shoulder of each panel is offset from a face of the panel approximately one-half the thickness of the panel.

17. The sidewall of claim 16 wherein each panel's first configured end is on the front side of the panel and the second configured end is on the back side of the panel.

18. The sidewall of claim 17 wherein each panel's stepped shoulder has a beveled external edge.

19. The sidewall of claim 13 wherein said panel has a width of from about three feet to about six feet, a length of from about four feet to about twelve feet and a thickness of up to about one-half inch.

20. The sidewall of claim 19 wherein the panel has a thickness of from about 150 mils to about 500 mils and the metal claddings each has a thickness of from about 10 mils to about 25 mils.

* * * * *